Nov. 18, 1958 F. G. RICHARDSON Re. 24,567
WELD NUT AND METHOD OF MAKING SAME
Original Filed June 19, 1952 2 Sheets-Sheet 1
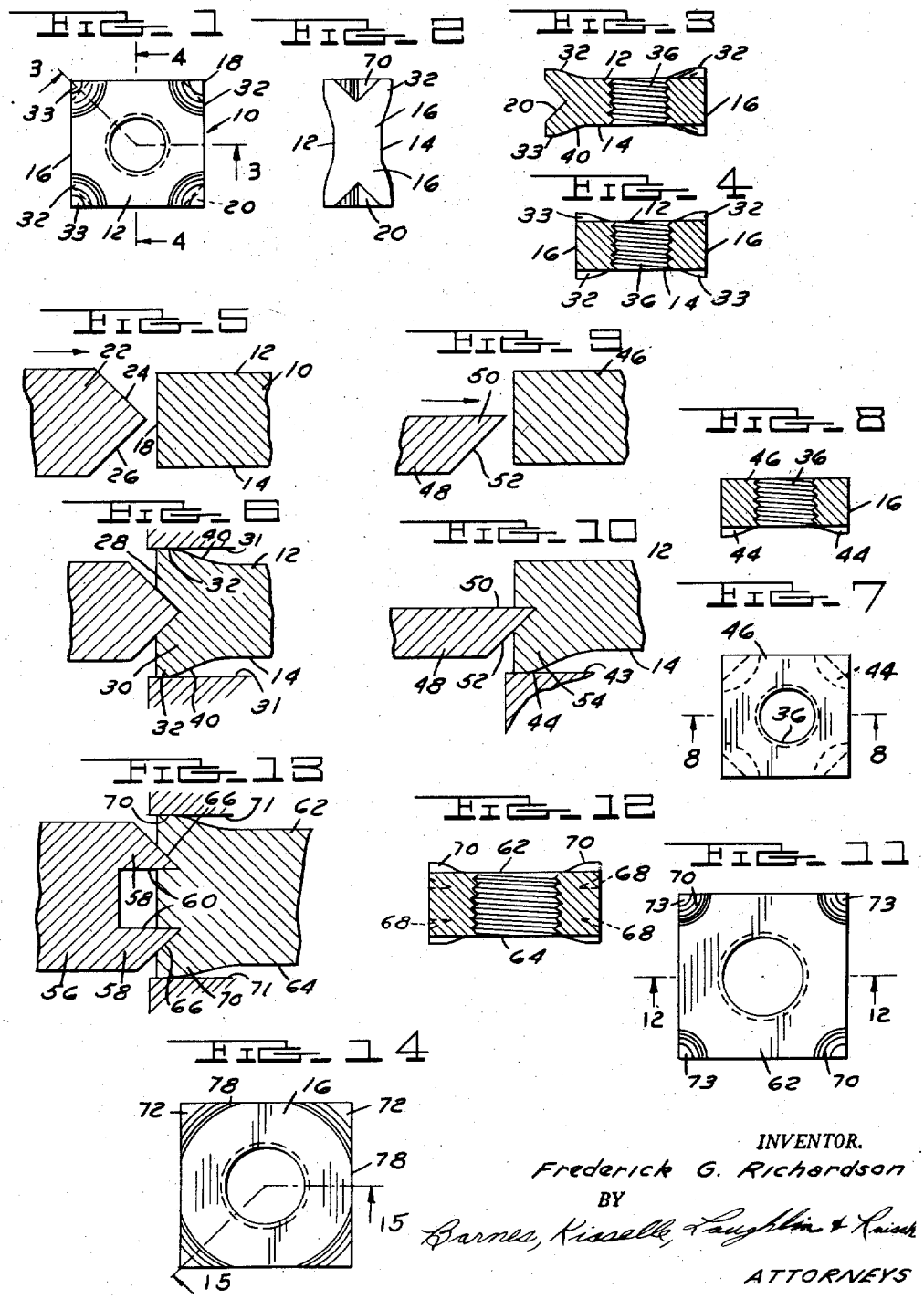
INVENTOR.
Frederick G. Richardson
BY
Barnes, Kisselle, Raubin & Raisch
ATTORNEYS

WELD NUT AND METHOD OF MAKING SAME

Original Filed June 19, 1952 2 Sheets-Sheet 2

INVENTOR.
Frederick G. Richardson
BY
Barnes, Kisselle, Raugklin & Raisch
ATTORNEYS United States Patent Office Re. 24,567
Reissued Nov. 18, 1958

24,567

WELD NUT AND METHOD OF MAKING SAME

Frederick G. Richardson, Detroit, Mich.

Original No. 2,761,483, dated September 4, 1956, Serial No. 294,314, June 19, 1952. Application for reissue October 30, 1956, Serial No. 619,372

5 Claims. (Cl. 151—41.7)

Matter enclosed in heavy brackets [ ] appears in the original patent but forms no part of this reissue specification; matter printed in italics indicates the additions made by reissue.

This invention relates to a weld nut and the method of making the same.

It is an object of this invention to provide a weld nut that can be manufactured economically and which is admirably suited for feeding from hoppers by mechanical feeding mechanisms.

A further object of this invention resides in the provision of a weld nut having projections thereon which facilitate the ready attachment of the nut to a backing plate by resistance welding.

In the drawings:

Fig. 1 is a top elevation of one form of nut of this invention.

Fig. 2 is a side elevation of the nut shown in Fig. 1.

Fig. 3 is a sectional view along the lines 3—3 in Fig. 1.

Fig. 4 is a sectional view along the lines 4—4 in Fig. 1.

Figs. 5 and 6 are diagrammatic sectional views showing the manner in which the operation of forming the weld projections at the corners of the nut is performed.

Fig. 7 is a top plan view of a weld nut of modified construction.

Fig. 8 is a sectional view along the lines 8—8 of the nut illustrated in Fig. 7.

Figs. 9 and 10 are diagrammatic sectional views showing the manner in which the weld projections on the nut illustrated in Fig. 7 are formed.

Fig. 11 is a top plan view of a further modification of the nut of this invention.

Fig. 12 is a sectional view taken along the lines 12—12 in Fig. 11.

Fig. 13 is a diagrammatic sectional view illustrating the manner in which the nut shown in Fig. 12 is indented at the corners thereof.

Fig. 14 is another modification of the nut of this invention.

Figure 15:
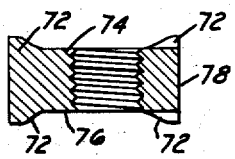
Fig. 15 is a sectional view along the lines 15—15 in Fig. 14.

Referring first to Figs. 1 through 6, there is shown a nut having a body portion 10 provided with a top wall 12, a bottom wall 14 and a plurality of side walls 16 which intersect to form corner portions 18. The nut illustrated is of square shape, but it will be appreciated that the nut may be formed with the shape of any regular polygon. At each corner the nut is indented at the vertically central portion thereof to form a V-shaped notch 20. Notch 20 is formed not by removing metal from the corner of the nut but by means of a tool 22 having a wedge-shaped end defined by angularly related faces 24 and 26. Tool 22 is driven into the corners 18 of the nut in a direction generally diagonally of the nut. The faces 24 and 26 of tool 22 are inclined to the top and bottom faces of the nut and cut into the corner portion of the nut such as to displace the metal at the corners of the nut vertically as shown in Fig. 6. The face 24 displaces the corner portion 28 upwardly and the face 26 displaces the corner portion 30 downwardly. The displaced metal portions 28 and 30 form a projection 32 at each corner 18 of the nut on both the top and bottom faces 12 and 14, respectively.

Preferably, the displacement of the projections 32 is not permitted to proceed in an entirely unconfined manner. I have found that in practice all the weld projections 32 on each nut should be accurately controlled to the same size in order to produce a perfect weld. Thus, the operation of indenting the corners of the nut is preferably performed in conjunction with a die having flat faces 31 which limit the displacement of the metal at the corners of the nut in a vertical direction. By employing such a die on which the corners of the nut are permitted to bottom, it is possible to produce nuts with tolerances within a few thousandths of an inch. The bottoming of the nut corners of the die faces 31 forms small flat facets 33 on each of the projections 32. This operation causes the projections 32 to be formed with a taper in a direction inwardly and towards the top and bottom faces 12 and 14, respectively, of the nut. The operation shown in Figs. 5 and 6 simply displaces the metal at the corners of the nut vertically in opposite directions. The top and bottom faces 12 and 14, respectively, remain substantially flat except for the projections 32, and the side walls 16 of the nut also remain substantially flat.

Figure 16:
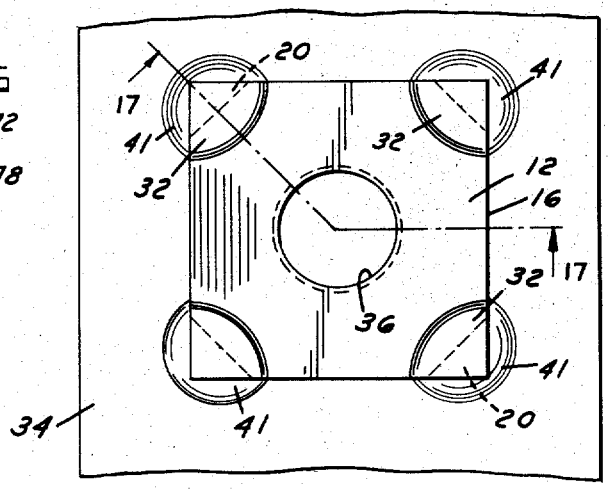
Fig. 16 is a top plan view showing the nut illustrated in Fig. 1 welded to a backing plate.

The nut thus provided is admirably suited for hopper feeding. The nut is symmetrical with straight sides and with the weld projections on both the top and bottom surfaces of the nut. Thus, the nut may be fed from a hopper to a plate such as shown at 34 in Fig. 16 with either face down. The straight sides of the nut simplify the design of the nut-handling mechanism, and the V-shaped notches 20 may serve as holding means in the welding operation. In welding, a nut such as that shown at 10 is placed with either face down on a backing plate 34 with the central threaded aperture 36 disposed concentrically over an opening 38 in the plate 34. Thereafter, the nut is spot welded to the plate 34 by means of opposed electrodes (not shown) which are arranged on opposite sides of the nut and plate. The welding operation is conventional. Current is caused to pass between the electrodes and through the nut and the plate while the electrodes are pressed toward one another.

Figure 17:
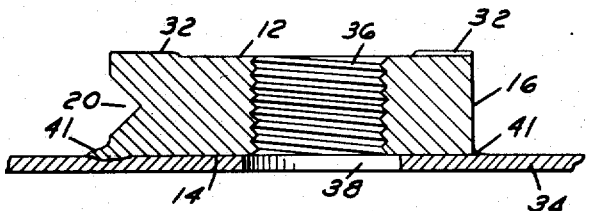
Fig. 17 is a sectional view along the lines 17—17 in Fig. 16.
Figure 18:
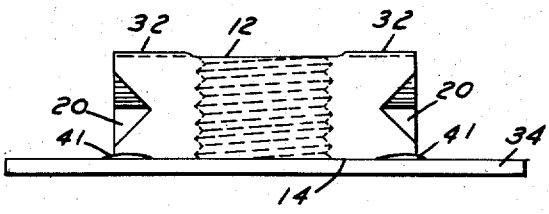
Fig. 18 is a side elevation of the nut and backing plate shown in Fig. 16.

The high current flowing through the projections 32 causes these projections to become progressively heated to a somewhat molten or plastic condition; and when the nut is subjected to pressure in a direction towards the plate 34, these projections become fused to the plate 34. In this connection I have found that the shape of the projections 32 as illustrated is very important. Since the projections 32 are all the same size, the nut will rest solidly on the plate 34 and will not rock. As the projections become heated and the nut pressed against the plate, the flat facets 33 and the taper designated at 40 cooperate to cause the metal to flow in a direction radially outwardly. As the projections 32 become heated the molten metal at each projection is backed in a radially inward direction by the solid metal of tapering portion 40 of the projection. Thus, in following the path of least resistance, the metal flows in an outward direction and forms fillet portions 41 around the base of each corner of the nut. This eliminates the necessity of providing a protective collar at the center of the nut, the formation of which is necessary in many weld nuts with which I am familiar to prevent the weld spit from damaging the threads of the aperture 36. Incidentally, it will be observed that the contact pressure of the electrode on the top face of the nut causes the projections 32 on the top face 12 of the nut to become heated and somewhat flattened as indicated at 42 in Fig. 17.

In Figs. 7 and 8 there is illustrated a modified form of nut which is substantially the same as the nut illustrated in Figs. 1 through 4 with the exception, however, that weld projections 44 are formed only on the bottom face of the nut. The top face 46 of the nut is substantially flat throughout its extent. The projections 44 may be formed on only the bottom face of the nut by the use of a tool 48 such as illustrated in Figs. 9 and 10. The tool 48 has a wedge-shaped point defined by two angularly related faces 50 and 52, the face 50 being aligned substantially parallel to the top face 46 of the nut and the face 52 being inclined thereto. When the tool 48 is driven into the corner portion of the nut, the only portion of the metal which is displaced is that which is located below the angularly inclined face 52 of the tool. This portion is generally designated 54 in Fig. 10, and the displacement of this metal in conjunction with the flat die faces 43 produces the projection 44 of the same general shape as the projections 32 of the nut previously described.

The operation illustrated in Figs. 5 and 6 for forming projections on both the top and bottom faces of the nut may be impractical on heavy nuts of substantial thickness. In such cases, projections on both faces of the nut may be formed by the operation and apparatus illustrated diagrammatically in Fig. 13. In this case the tool 56 for indenting the corner portions of the nut is provided with two wedge-shaped points 58, each of which is defined by a flat face 60 which is aligned generally parallel to the top and bottom faces 62 and 64, respectively, of the nut and with inclined flat faces 66. The points 58 are spaced vertically apart with the faces 60 adjacently positioned. When the tool 56 is driven into the corner of the nut, the points 58 will form the vertically spaced indentations 68, the faces 66 displacing the metal adjacent the faces 62 and 64 vertically in opposite directions to form the welding projections 70 at the corners of the nut on both the top and bottom faces 62 and 64 of the nut. The projections 70 bottom against the flat die faces 71 to form flat facets 73 on each projection 70.

As pointed out previously, the advantage in forming the welding projections on both faces of the nut lies in the simplification in the apparatus for feeding the nuts from a hopper to a plate or other member, such as illustrated at 34, on which the nuts are to be welded. With nuts of substantial thickness such as illustrated in Fig. 13, a tool having a single wedge-shaped point such as illustrated in Figs. 5 and 6 and directed at the central portion of the corners of the nut would have to displace too much metal in order to form the welding projections on both faces of the nut. The double-ended tool 56 therefore eliminates this difficulty and enables the formation of the welding projections on both faces of the nut with a displacement of only a relatively small portion of the metal.

The nut illustrated in Figs. 14 and 15 is generally the same as those previously described in that it also is formed with welding projections 72 on one or both faces thereof. The projections 72 are shaped similar to the welding projections previously described but are formed without indenting the corners of the nut. These welding projections are formed by either milling, coining, upsetting, or some similar operation. The nut, however, is provided with flat top and bottom faces 74 and 76 one of which lies flatly against the plate such as illustrated at 34 after the nut is welded thereto; and the side faces 78 of the nut are flat and substantially perpendicular to the top and bottom faces 74 and 76, respectively. This symmetrical construction makes for easy handling of the nuts by hopper feed mechanisms and is conducive to rapid feeding of the nuts.

Thus, it will be seen that I have provided a weld nut which can be manufactured very economically and which is very desirable from the standpoint of production. The symmetrical shape of the nut simplifies the design of mechanism for feeding such nuts from a hopper or the like and also enables the nuts to be fed at a very rapid rate. In addition, it will be observed that the shape of the nuts simplifies the operation of welding such nuts to a plate. The shape of the radially inwardly tapered projections results in a flow of the metal in an outward direction when the nuts are welded. The metal flows in a direction away from the central threaded aperture. Thus, there is no need for providing means for protecting the threads from weld spit.

The formation of the indentations at the corners of several of the modifications of nuts described above not only provides a simple and inexpensive way of forming the weld projections on the top and/or bottom faces of the nut but also provides symmetrically spaced notches on the nut which may be utilized as a holding means during the welding operation. It will be appreciated, of course, that the size and shape of the weld projections, when formed by indenting the corners of the nut, can be varied as desired by controlling the shape of the tool by which these indentations are formed and by controlling the depth to which the tool is driven into the nut.

I claim:

1. A weld nut particularly adapted for use in hopper feeding comprising a nut body, a threaded bore in the center of said body, said body having generally flat end surfaces adjacent said bore and generaly flat side surfaces meeting at corner edges to form sharp points, and a plurality of weld projections, one at each corner of each of said end surfaces, each of said projections having a flat end surface parallel with said end surfaces of the nut and equally spaced therefrom, and each of said projections including an end surface inclined inwardly from the projection end surface to the nut end surface, said body metal and projection metal being of the same standard nut stock and substantially the same hardness.

2. The method of forming a weld nut from a blank consisting of a standard threaded nut of standard nut stock, having generally flat, generally parallel end surfaces and flat side surfaces meeting at corner edges intersecting the end surfaces to form sharp points, which includes positioning such a nut in a zone of treatment with *at least one of* its end surface*s* confined by *a* flat surface[s] spaced [apart] *from any such confined end the nut* a predetermined distance equal to [the height of the nut plus] the height of desired weld projections at [the] *any such* end[s] of said nut, and there exerting lateral inward pressure of metal shearing intensity against a single point spaced vertically between the ends at the corner areas of the nut, continuing said lateral inward shearing pressure along a horizontal line for a distance no greater than about one-half the distance between said [the] initial contact point and the nearest threads of said nut, and exerting axial pressure between the sheared corner portions forthwith following said lateral pressure, and being substantially simultaneous therewith, said axial pressure being of metal bending intensity and the extent of said axial pressure at the lateral edges of said nut being slightly in excess of the amount required to bring said corners into contact with said confining surface[s], whereby said corners are formed as axial projections having flattened lateral surfaces of equal height with a portion inclined inwardly towards the *adjacent* end surface[s] of said nut adjacent the threaded portion thereof.

3. The method of forming a weld nut from a blank consisting of a standard threaded nut of standard nut stock, having generally flat, generally parallel end surfaces and flat side surfaces meeting at corner edges intersecting the end surfaces to form sharp points, which includes positioning such a nut in a zone of treatment with its end surfaces confined by flat surfaces spaced apart a predetermined distance equal to the height of the nut plus the height of desired weld projections at the ends of said nut, and there exerting lateral inward pressure of metal shearing intensity against a single point at the vertical center of the corner areas of the nut, continuing said lateral inward shearing pressure along a horizontal line for a distance no greater than about one-half the distance between said [the] initial contact point and the nearest threads of said nut, and exerting axial pressure between the sheared corner portions forthwith following said lateral pressure, and being substantially simultaneous therewith, said axial pressure being of metal bending intensity and the extent of said axial pressure at the lateral edges of said nut being slightly in excess of the amount required to bring said corners into contact with said confining surfaces, whereby said corners are formed as axial projections having flattened lateral surfaces of equal height and with a portion inclined inwardly towards the end surfaces of said nut adjacent the threaded portion thereof.

4. The method of forming a weld nut from a blank consisting of a standard threaded nut of standard nut stock, having generally flat, generally parallel end surfaces and flat side surfaces meeting at corner edges intersecting the end surfaces to form sharp points, which includes positioning such a nut in a zone of treatment with its end surfaces confined by flat surfaces spaced apart a predetermined distance equal to the height of the nut plus the height of desired weld projections at the ends of said nut, and there exerting lateral inward pressures of metal shearing intensity against two single points equally spaced from the vertical center of the corner areas of the nut, continuing said lateral inward shearing pressures along two separate horizontal lines for a distance no greater than about one-half the distance between said [the] initial contact point and the nearest threads of said nut, and exerting axial pressures between the remainder of the nut corners and the sheared corner portions forthwith following said lateral pressures, and being substantially simultaneous therewith, said axial pressures being of metal bending intensity and the extent of said axial pressures at the lateral edges of said nut being slightly in excess of the amount required to bring said corners at each end of the nut into contact with said confining surfaces, whereby said corners are formed as axial projections having flattened lateral surfaces of equal height with a portion inclined inwardly towards the end surfaces of said nut adjacent the threaded portion thereof.

5. The method of forming a weld nut from a blank consisting of a standard threaded nut of standard nut stock, having generally flat, generally parallel end surfaces and flat side surfaces meeting at corner edges intersecting the end surfaces to form sharp points, which includes positioning such a nut in a zone of treatment with [its] *a first* end surface[s] confined by *a* flat surface[s] spaced [apart] *from said first end of the nut* a predetermined distance equal to [the height of the nut plus] the height of desired weld projections at [a] *said* first end of said nut, and there exerting lateral inward pressure of metal shearing intensity against a single point between [said] *the* vertical center and said first end of the corner areas of the nut, continuing said lateral inward shearing pressure along a horizontal line for a distance no greater than about one-half the distance between said [the] initial contact point and the nearest threads of said nut, and exerting axial pressure between the remainder of the nut corners and the sheared corner portions forthwith following said lateral pressure, and being substantially simultaneous therewith, said axial pressure being of metal bending intensity and the extent of said axial pressure at the lateral edges of said nut being slightly in excess of the amount required to bring said corners into contact with said confining surfaces, whereby the corners of said first end are formed as axial projections having flattened lateral surfaces of equal height with a portion inclined inwardly towards the end surface[s] of said nut adjacent the threaded portion thereof.

References Cited in the file of this patent or the original patent

UNITED STATES PATENTS

| | | |
|---|---|---|
| 483,740 | Hambay | Oct. 4, 1892 |
| 1,064,699 | Berns | June 17, 1913 |
| 2,054,187 | Almdale | Sept. 15, 1936 |
| 2,123,843 | Cox | July 12, 1938 |
| 2,125,878 | Beasley | Aug. 9, 1938 |
| 2,167,285 | Smith | July 25, 1939 |
| 2,179,398 | Briggs | Nov. 7, 1939 |
| 2,443,815 | Dahl | June 22, 1948 |
| 2,517,476 | Frost | Aug. 1, 1950 |
| 2,612,647 | Howe | Oct. 7, 1952 |